United States Patent [19]

Sommer et al.

[11] 4,234,895
[45] Nov. 18, 1980

[54] CONVERTING A VIDEO SIGNAL INTO A TWO-LEVEL SIGNAL

[75] Inventors: Rudiger Sommer; Hermann Wischer, both of Kiel, Fed. Rep. of Germany

[73] Assignee: Dr. Ing. Rudolf Hell GmbH, Kiel, Fed. Rep. of Germany

[21] Appl. No.: 671

[22] Filed: Jan. 3, 1979

[30] Foreign Application Priority Data

Jan. 9, 1978 [DE] Fed. Rep. of Germany ....... 2800759

[51] Int. Cl.³ .............................................. H04N 1/40
[52] U.S. Cl. .................................... 358/282; 358/280
[58] Field of Search ........................ 358/282, 284, 280

[56] References Cited

U.S. PATENT DOCUMENTS

| | | | |
|---|---|---|---|
| 3,159,815 | 12/1964 | Groce | 340/146.3 R |
| 3,472,958 | 10/1969 | Estock | 358/282 |
| 3,566,281 | 2/1971 | Baumann | 358/282 |
| 3,952,144 | 4/1976 | Kolker | 358/282 |

FOREIGN PATENT DOCUMENTS 1171464 6/1964 Fed. Rep. of Germany .
1408696 10/1975 United Kingdom .

*Primary Examiner*—Howard W. Britton
*Attorney, Agent, or Firm*—Brisebois & Kruger

[57] ABSTRACT

A facsimile scanning method for converting a video signal obtained by opto-electronic scanning of an original into a two-level signal suitable for transmission.

A first companion signal is first generated which lies essentially above the video signal and which follows the video signal when it rises but when the video signal declines remains at the voltage reached when the video signal was at a maximum until a difference value between the first companion signal and a reference signal is reached, which then comes close to the declining video signal until the difference value is reached, which remains at the voltage value then reached until the first companion coincides with the video signal, and which then follows the rising video signal.

At the same time a second companion signal is generated which lies substantially below the video signal and which progresses accordingly. From the first and second companion signals is derived a threshold signal which follows the video signal dynamically. The two-level signal is obtained by comparing the threshold signal with the video signal.

The reference signal may be the video signal or one of the companion signals. The difference values are preset at constant levels or are proportional to the mean brightness of the background of the original.

9 Claims, 10 Drawing Figures

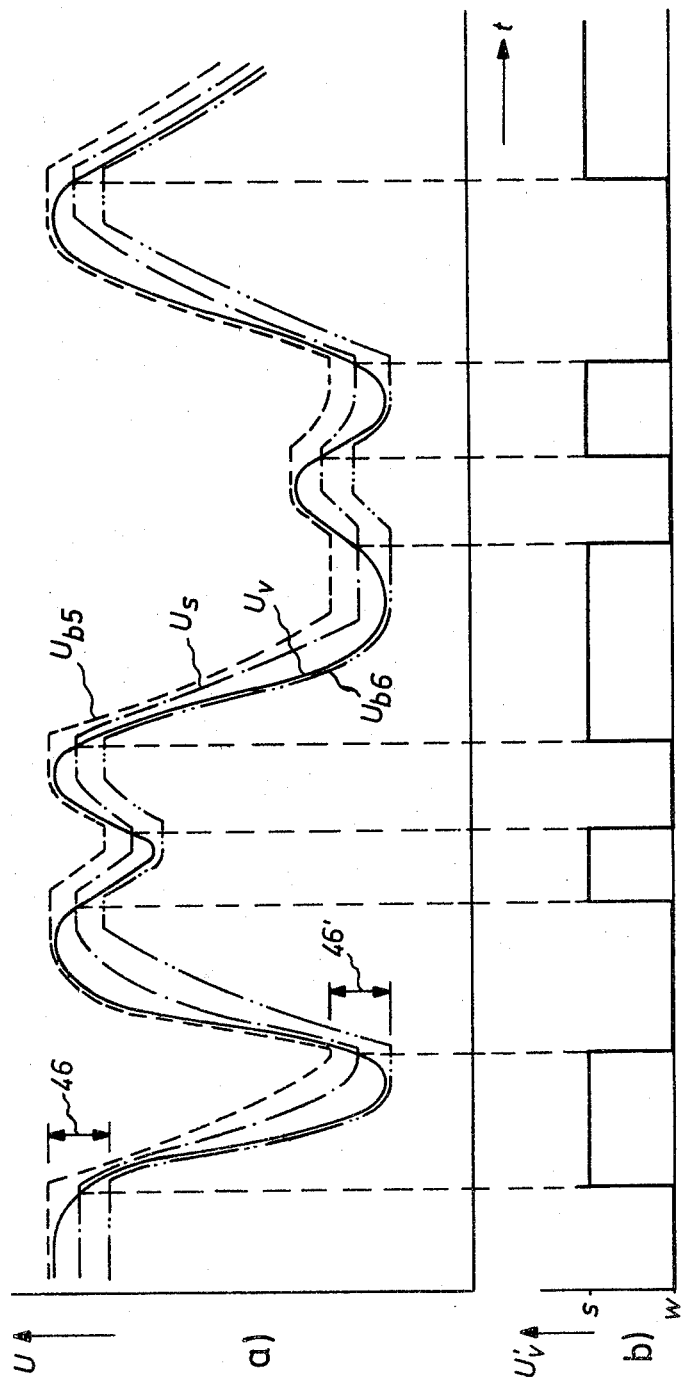

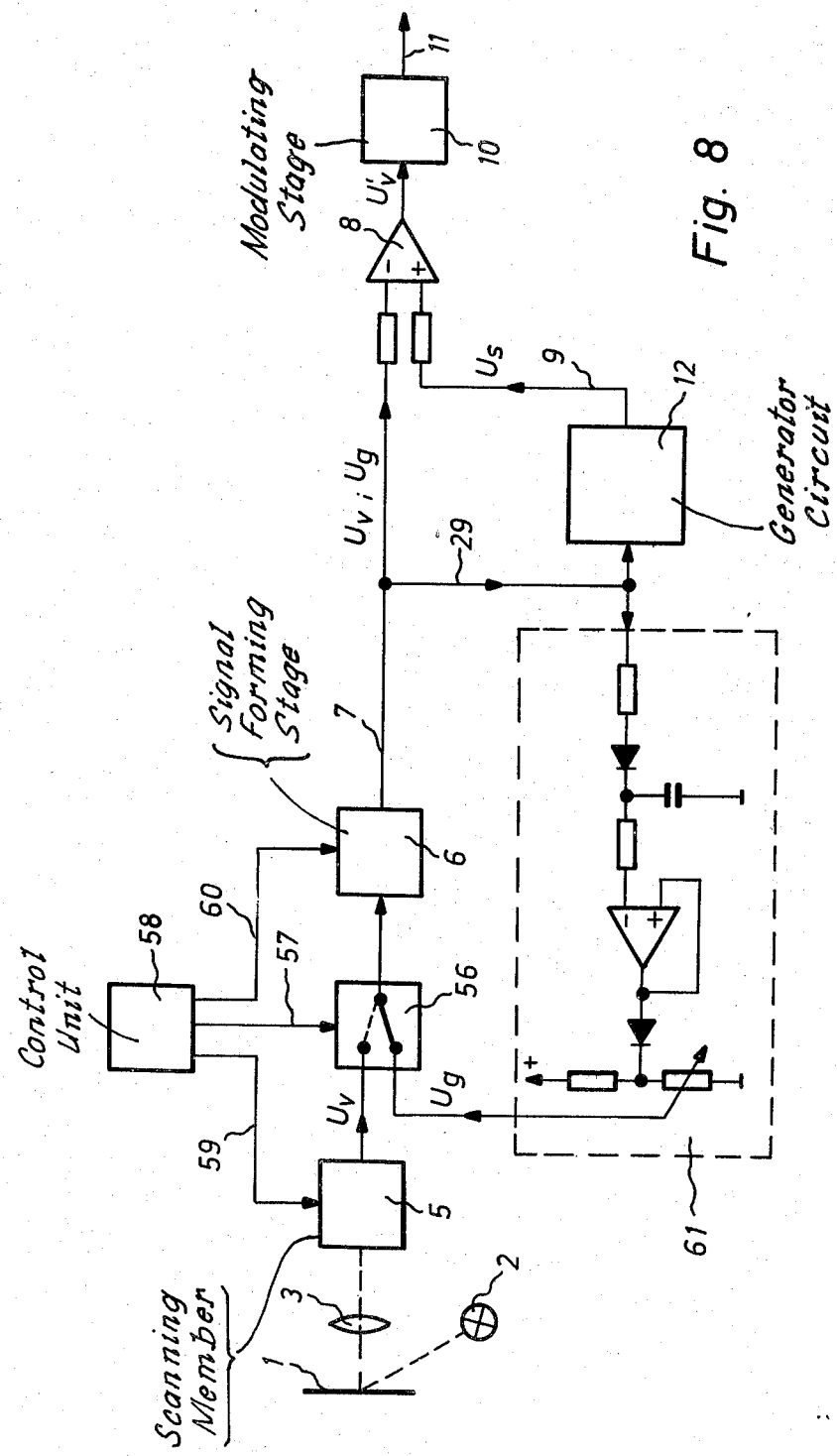

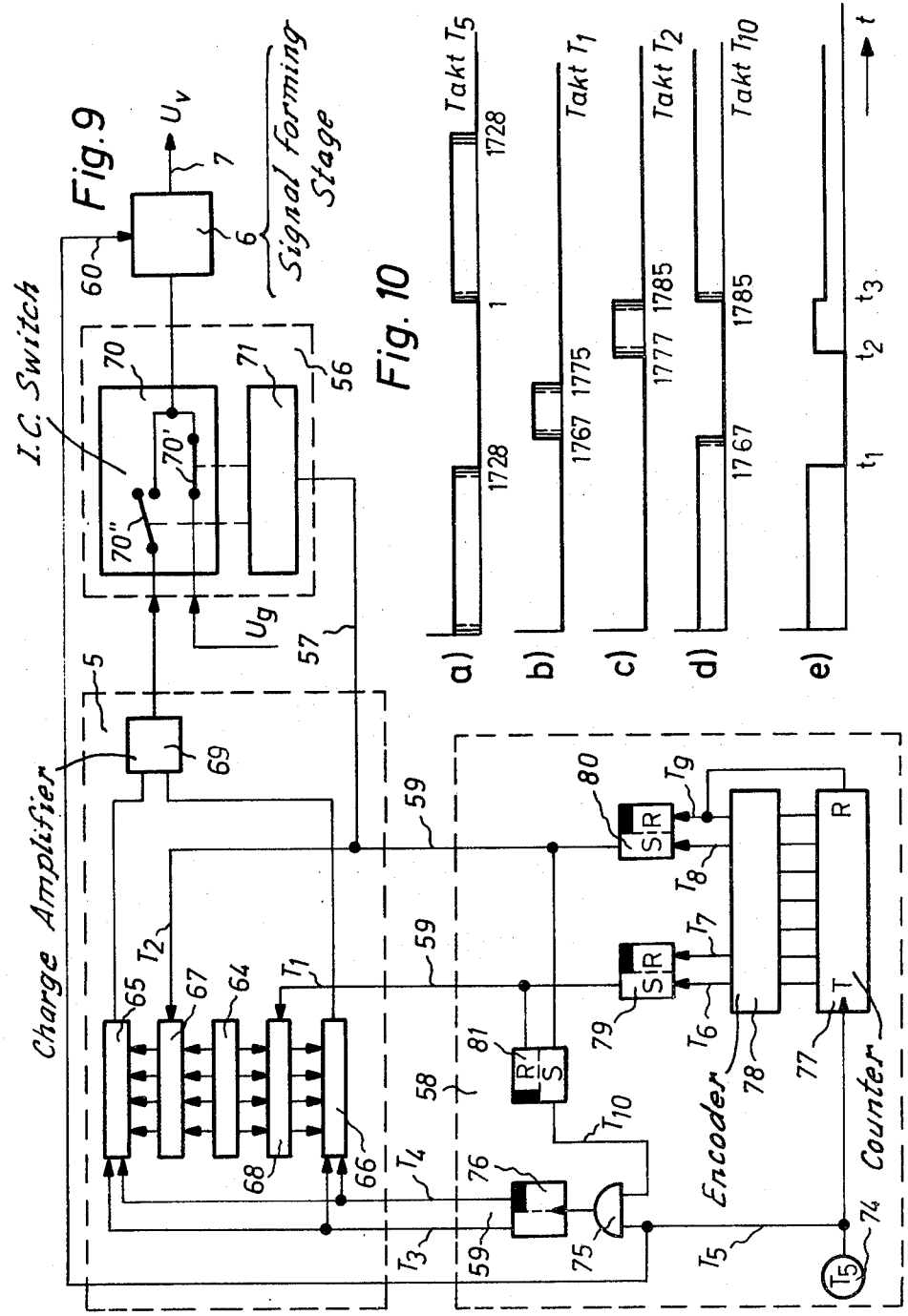

CONVERTING A VIDEO SIGNAL INTO A TWO-LEVEL SIGNAL

BACKGROUND OF THE INVENTION

The present invention relates to methods, usable in a facsimile-scanner, for converting a video signal obtained by scanning an original point by point into a two-level signal by means of a comparison with a dynamic threshold signal, of the kind in which first and second companion signals for the video signal are generated by means of generators controlled by the video signal and the dynamic threshold signal is derived from the companion signals. Hereinafter, such a method will be referred to as "of the kind described".

In black and white facsimile transmission, an original to be copied is scanned point by point and line by line in a scanning device by an opto-electronic scanning member and the brightness information from the original is converted into a video signal.

The original may be a printed or typed document, a hand-written text or a graphic representation, in which cases both the background of the original (paper) and also the information applied to it may be white, black, grey or coloured.

The video signal obtained by scanning the original is amplified, converted in a subsequent evaluating circuit into a digital video signal (a black/white signal) and is passed to a reception device along a transmission channel. The reproducing member of the reception device is controlled by the video signal and produces the required copy of the original.

When a white area of the original is scanned, the scanning member emits a video signal of high amplitude, while when a black area of the original is scanned it emits a video signal of low amplitude and in the case of a grey or coloured detail in the original it emits a video signal of medium amplitude. Signals of medium amplitude also occur when narrow lines are scanned in the original.

In the evaluating circuit, the video signal is continuously compared with a threshold signal and it is decided whether a video signal of given amplitude is to be evaluated as "white" or "black" and whether it is to be converted to the white value or black value of the digital video signal.

The correct evaluation of signals of medium amplitude presents considerable problems.

When the background of an original has white and coloured regions which also contain information, there is not very much contrast between the information and the background. In this case, because of its limited resolving power, the scanning member emits a video signal with only slight variations in amplitude but this signal must still be recognised and correctly evaluated at the time of signal conversion.

A reduction in contrast which hampers the interpretation of the signal also occurs when the background varies in brightness from original to original or when the brightness of the background alters within the original, such as may be the case when scanning yellowed paper.

Since the scanning member detects both alterations in the brightness of the background and also alterations in brightness caused by information in the original, a further problem which occurs at the time of the signal conversion is the correct interpretation of the proportions of the video signal attributable to background brightness and to information brightness.

It is already known from U.S. Pat. No. 3,159,815 to compare the video signal with a constant threshold signal for digitising purposes.

With this so-called "constant threshold" the evaluation of a coloured original which can be performed is very poor.

If for example an original with a coloured background and black or white information is being scanned, and if in principle the decision taken with video signals of medium amplitude is for "black", then black information on a coloured background will be lost. If on the other hand the decision is exclusively for "white", then white information on a coloured background will be ignored.

It is true that an operator can set the threshold signal to give a favourable result before the scanning proper but an optimum setting which involves no loss of information is not possible.

By choosing a suitable threshold signal it is also possible to remedy differences in background brightness from original to original. However, since the threshold signal is then constant during the actual scanning operation, no allowance is made for slow changes in background brightness within the original, as a result of which the DC voltage component of the video signal shifts in relation to the constant threshold and the video signal may be misinterpreted.

To compensate for slow variations in background brightness, it is known from German Auslegeschrift No. 1171464 to compare the video signal with a threshold signal which is proportional to the mean background brightness of the original. This so-called "sliding threshold" is slowly readjusted when there are changes in the brightness of the background, thus automatically compensating for differences in the whiteness of the paper within the original.

The readjustment of the threshold signal to follow the change in the brightness of the background takes place with a long time-constant. The threshold signal therefore adjusts itself to the new value only after several lines have been scanned in the original. Rapid changes in the brightness of the background, such as occur in originals containing information on a coloured background, cannot be allowed for by a sliding threshold signal.

It is therefore an object of the invention to provide a method of converting a video signal into a two-level video signal of the kind described, but which overcomes or minimises the disadvantages mentioned and by means of which coloured originals and originals containing fine details can be converted into a purely black and white copy without any substantial loss of information.

SUMMARY OF THE INVENTION

This and other objects are achieved in accordance with the invention by providing a method of the kind described, wherein the first companion signal substantially follows a rise in the video signal but when the video signal declines it remains at the voltage value reached when the video signal was at a maximum approximately until a difference value is reached between said first companion signal and a reference signal, and it then comes close to the declining video signal until the difference value from the reference signal is reached, it remains approximately at the voltage value which it then reaches until it substantially coincides with the video signal, and it then again follows the rising video signal, and wherein the second companion signal substantially follows a decline in the video signal but when the video signal rises it remains approximately at the voltage value reached when the video signal was at a minimum until a difference value between said second companion signal and a further reference signal is reached, and it then comes close to the risign video signal until the difference value from the further reference signal is reached, it remains approximately at the voltage value then reached until it substantially coincides with the video signal and it then again follows the declining video signal, and wherein the dynamic threshold signal is obtained by voltage division between the companion signals.

German patent specification No. 1537560 discloses a facsimile scanner having a cathode-ray tube as its scanning member in which a dynamic threshold signal for the video signal is already derived from two companion signals.

The companion signals and the threshold signals are however produced on quite different principle and their production is adapted to the particular noise characteristics of the electron-beam scanning member.

Thus, in essence, the known circuit arrangement eliminates the high proportion of noise in the video signal when it is converted.

From the video signal, a first control signal is generated in a first generator circuit, and in a background evaluating circuit a background signal is generated which is proportional to the mean brightness of the background of the original.

The first control signal and the background signal are brought together at an OR circuit so that at any given time it is the more positive of the two signals which is subjected to further processing as a first companion signal.

Also obtained from the video signal are a second control signal in a second detector, and, in a noise detector, an auxiliary signal which is proportional to the amplitude of the noise in the video signal.

The second control signal and the auxiliary signal are gated to give a second companion signal.

In the present application there is no logic gating of the signals to produce a companion signal. The video signal and background signal merely control the generators which produce the companion signals.

In the known circuit arrangement, the first and second companion signals are in turn logic gated to produce the threshold signal, the threshold signal lying above positive amplitudes of the background signal set by the background noise when background is being evaluated and lying below these amplitudes when information is being evaluated.

In the present application on the other hand the threshold signal is derived from the two companion signals by voltage division, and it lies at all times between the said companion signals.

To compare the threshold and video signals, a limiter stage is provided in the known circuit arrangement in which parts of the video signal lying above the threshold signal are interpreted as information and parts lying below are interpreted as noise signals or background signals. It is only when the video signal has been modified in the limiter stage that it is converted into the digital video signal in a subsequent trigger stage having a fixed changeover point.

To generate the digital video signal, in the present application the analogue video signal and the dynamic threshold signal are compared with one another directly in a comparator.

The circuit arrangement disclosed in the German patent specification hereinabove referred to is complicated since the signal noise from the electron-beam scanning member is allowed for and additional control signals are derived to control the brightness of the cathode ray tube.

A further disadvantage lies in the fact that the companion signals are free to approach the video signal without restraint. Thus, undesirable oscillation of the threshold signal occurs wheich may result in uncertain decisions and the loss of information.

With the present invention the oscillation of the threshold signal is avoided by means of the difference value, which in every case guarantees a minimum spacing between the companion signals and the video signal or between the companion signals themselves.

A minimum mutual spacing between the signals has the advantage that signals of small amplitude, which are produced by particles of dirt in the original for example, do not result in an unwanted changeover of the signal and thus to incorrect information when the video signal is being evaluated.

BRIEF DESCRIPTION OF THE DRAWINGS

In order that the invention may be more clearly understood, reference will now be made to the accompanying drawings which show certain embodiments thereof by way of example and in which:

FIG. 6 is another diagram illustrating the evaluation of the video signal;

FIG. 8 shows a circuit arrangement;

FIG. 9 shows embodiments of scanning member, changeover switch, converter stage and control unit; and FIG. 10 is a diagram of pulses.

DETAILED DESCRIPTION OF PREFERRED EMBODIMENTS

Figure 1:
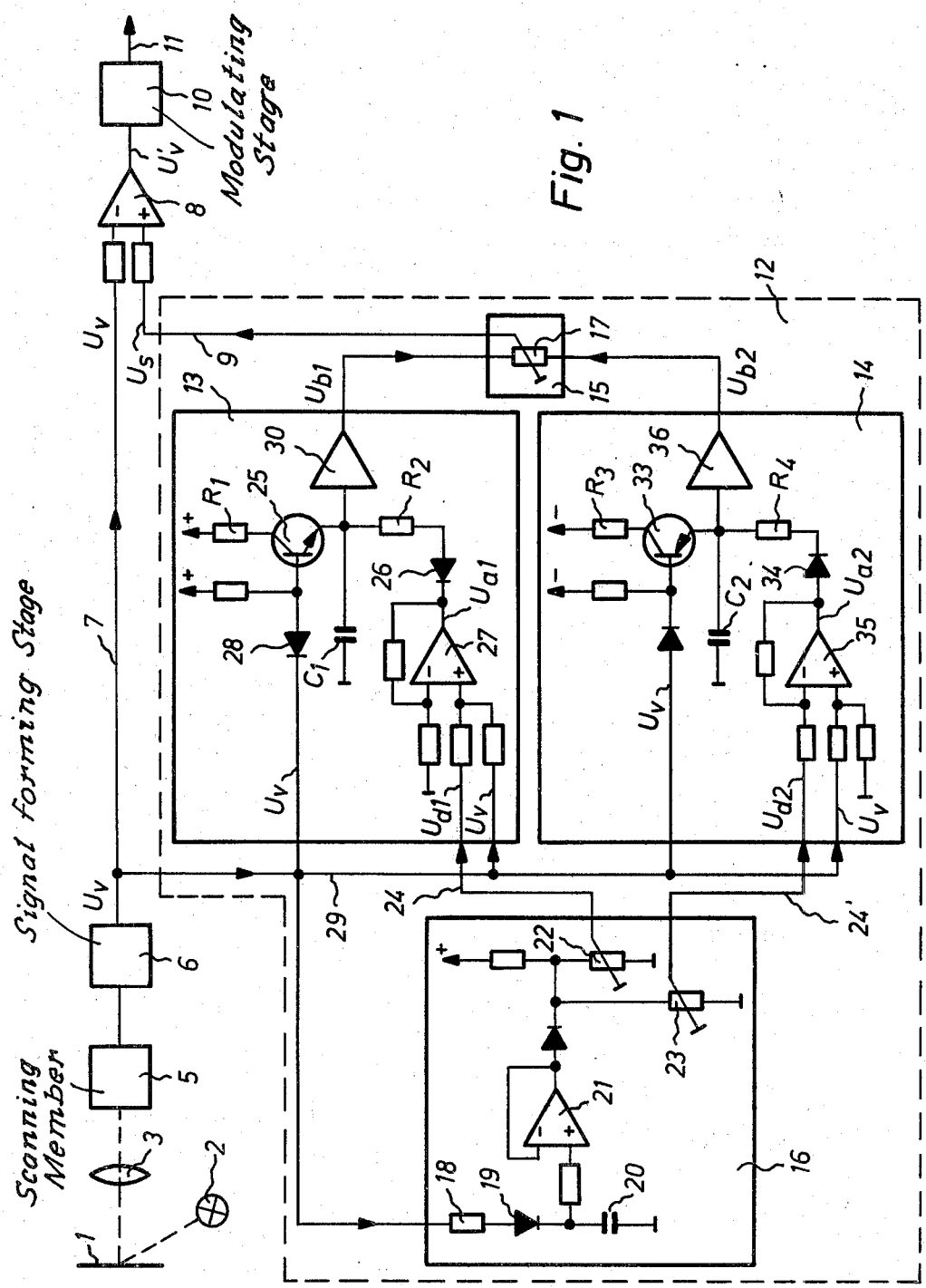
FIG. 1 is a block circuit diagram of a facsimile scanner with an embodiment of generator circuit for generating a dynamic threshold signal.

Referring now to the drawings, FIG. 1 shows the general construction of a facsimile scanner having a generator circuit to produce a dynamic threshold signal.

The original 1 to be copied is illuminated by a light source 2 and light, modulated by the brightness information of the original 1, is reflected via an optical system 3 into a scanning member 5 and there converted by opto- electronic transducers into a video signal.

The opto-electronic transducer may be a single photodiode which emits a continuous video signal. In this case the scanning member 5 performs a movement in the line direction relative to the original 1 with a stepped advance taking place to the next line each time a line has been scanned.

It is however also possible for the opto-electronic transducer to be constructed from a plurality, e.g. a row, of photodiodes which generate a pulsed or staircase video signal.

The row of photodiodes preferably extends across an entire line of the original 1, so that one line is scanned each time with no relative movement between the scanning member 5 and the original 1 and after this line has been scanned a stepped advance is made to the next line.

Advancing means are not shown in FIG. 1 since they are not part of the subject matter of the application and are well-known to those skilled in the art to which this invention relates.

The video signal produced in the scanning member 5 is amplified in a signal forming stage 6 and, if required in cases where the video signal is of pulsed form, is converted into a video signal of staircase form by means of a sample-and-hold circuit.

The video signal $U_v$ is fed along a line 7 to an evaluating circuit 8 in the form of a comparator in which a digital video signal $U'_v$ whose levels represent the values "black", and "white" is obtained by comparing video signal $U_v$ with the dynamic threshold signal $U_s$ on a line 9.

The digital video signal $U'_v$ is transmitted via a modulating stage 10 and a transmission channel 11 to a facsimile receiver (not shown) whose reproducing member produces the facsimile of the original.

The transmission channel 11 may be a land-line or a radio transmission path.

The generator circuit 12 comprises a first generator 13 to form a first companion signal $U_{b1}$ lying above the video signal $U_v$, a second generator 14 to form a second companion signal $U_{b2}$ lying below the video signal $U_v$, a junction stage 15, and a third generator 16.

In the junction stage 15, the dynamic threshold signal $U_s$ on line 9 is derived from the two companion signals $U_{b1}$ and $U_{b2}$ by voltage division. The dynamic threshold signal $U_s$ lies at all times between the companion signals $U_{b1}$ and $U_{b2}$, and its spacing from the companion signals can be adjusted by means of a potentiometer 17.

The third generator 16, comprises a peak rectifying circuit (18, 19) together with a smoothing capacitor 20 and a following high-impedance amplifier 21.

The smoothing capacitor 20 is charged to each maximum video signal amplitude (the white of the background). Because of the high impedance amplifier 21 the discharge time contant is extremely long and the smoothing capacitor 20 discharges to only a small extent between the individual charging phases.

From the voltage across the capacitor, difference values $U_{d1}$ and $U_{d2}$ on lines 24 and 24' are derived by means of potentiometers 22 and 23 respectively, which values are proportional to the means brightness of the background of the original 1 being scanned.

The difference values $U_{d1}$ and $U_{d2}$ are characteristic of specific minimum spacings, between the companion signals $U_{b1}$ and $U_{b2}$ respectively and a reference signal, which are observed in the formation of the companion signals.

Figure 3:
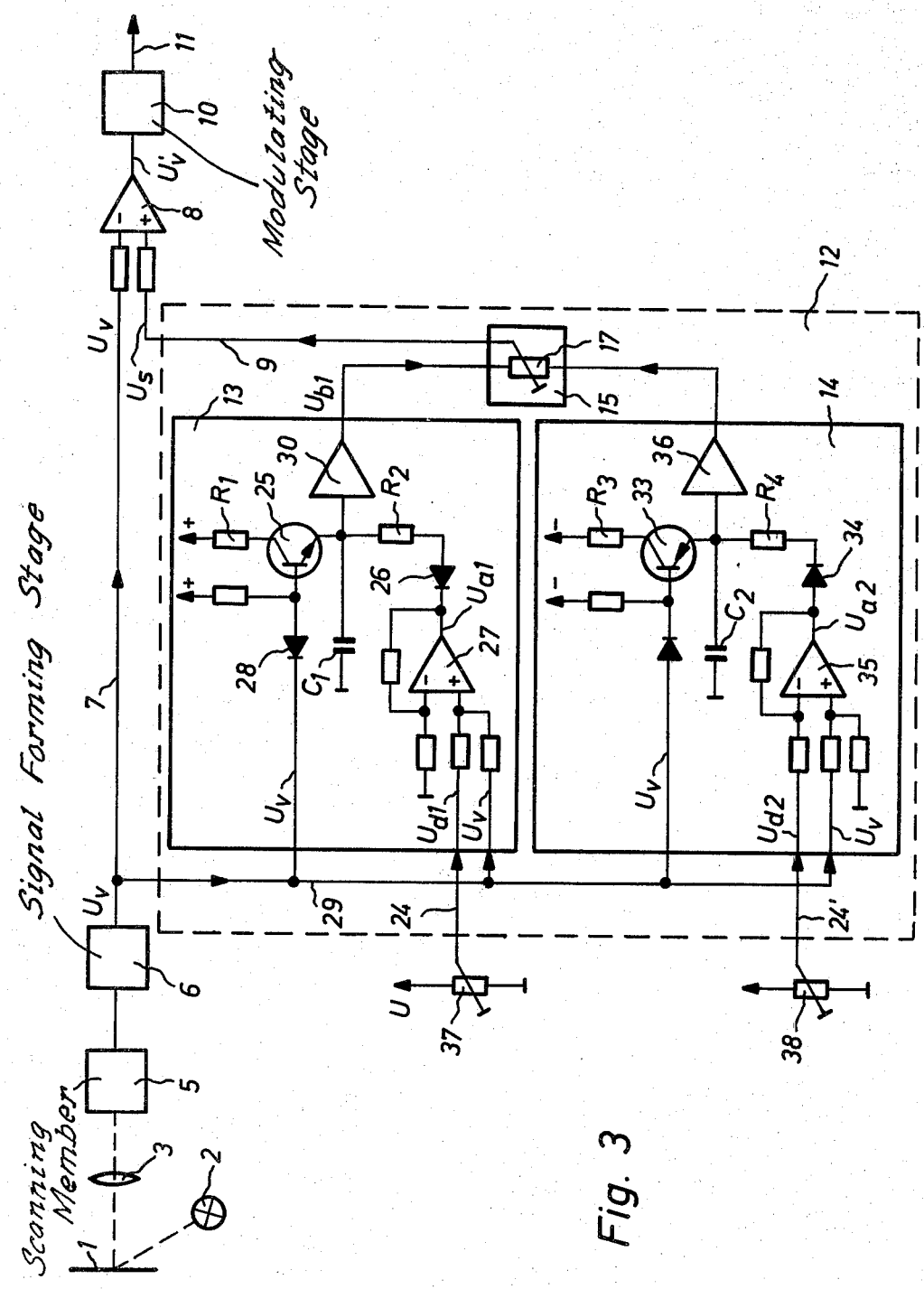
FIG. 3 shows a modified embodiment of generator circuit.

In the present case the minimum spacings are dependant on the mean brightness of the background of the original 1. It is however also possible for them to be set at constant levels, as illustrated in FIG. 3.

In the embodiment selected, the reference signal is the video signal, and the minimum spacings are therefore between respective companion signals and the video signal.

In a modification, the reference signal for one companion signal is the other accompanying signal, and the minimum spacing is therefore set between the companion signals.

Figure 2:
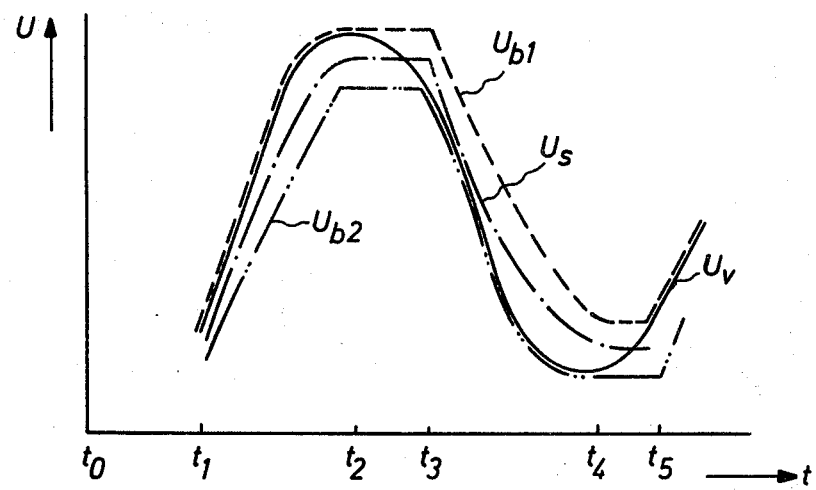
FIG. 2 is a diagram illustrating the operation of the generator circuit.

The first generator 13 to form the first companion signal $U_{b1}$ operates as follows: the waveform of companion signal $U_{b1}$ in relation to the video signal $U_v$ is illustrated in FIG. 2.

The first generator 13 has a charging capacitor $C_1$, a charging circuit containing a resistor $R_1$ and a transistor 25, and a discharge circuit containing a resistor $R_2$, a diode 26 and an adding amplifier 27.

The discharge of the capacitor is controlled with a short time constant ($\tau_1 \approx R_1.C_1$) by the video signal $U_v$ on a line 29, via transistor 25 and a diode 28. The discharge of the capacitor on the other hand takes place with a long time constant ($\tau_2 \approx R_2.C_1$) and is influenced by the output voltage ($U_{a1}$) from the adding amplifier 27. The output voltages $U_{a1}$ corresponds to the sum of the video signal $U_v$ and the associated difference value $U_{d1}$ (minimum spacing). The addition of the signals signifies a displacement of the video signal $U_v$ in the positive direction by the amount $U_{d1}$ of the difference.

The first companion signal $U_{b1}$ corresponds to the wave-form of the voltage $U_c$ at the charging capacitor $C_1$.

Whenever the video signal $U_v$ rises, the charging capacitor $C_1$ is charged up to the video signal $U_v$ with the short time constant $\tau_1$, as a result of which the companion signal $U_{b1}$ follows the video signal $U_v$ in the period $t_1$-$t_2$ (FIG. 2). At time $t_2$ the charging capacitor $C_1$ has been charged to the maximum value of the video signal $U_v$. When the video signal $U_v$ declines, transistor 25 blocks ($U_{c1} > U_v$) and the charging of the capacitor stops. The voltage $U_{c1}$ in the capacitor remains approximately at its maximum since the output amplifier 30 following it is of high impedance and the discharge circuit is still blocked. Only when the companion signal $U_{b1}$ has moved away from the video signal $U_v$ by the difference value $U_{d1}$ at time $t_3$ does diode 26 become conductive and initiate discharge with the time constant $\tau_2$.

In this phase the companion signal $U_{b1}$ comes close to the video signal $U_v$ following an e-function, until the difference value $U_{d1}$ is reached again at time $t_4$ and the discharge is stopped.

The discharge time constant $\tau_2$ is preferably selected to be approximately equal to the time taken to scan two to five points on the original 1. The approach of companion signal $U_{b1}$ to the video signal $U_v$ may of course take place in accordance with a different function. As well as the minimum spacing, the video signal itself or the black value (zero) may also be used as the terminal value for discharge.

The charging capacitor $C_1$ in turn holds its voltage at the level that has been reached until the companion signal $U_{b1}$ and the video signal $U_v$ coincide at time $t_5$. Companion signal $U_{b1}$ then follows the upward slope of the video signal once again.

The second generator 14 to form the second companion signal $U_{b1}$ similarly comprises a charging capacitor $C_2$, a charging circuit containing a resistor $R_3$ and a transistor 33, a discharge circuit containing a resistor $R_4$, a diode 34 and a subtracting amplifier 35, and a high impedance amplifier 36 connected following the charging capacitor $C_2$.

The substracting amplifier 35 shifts the video signal $U_v$ in the negative direction by the amount of the difference value $U_{d2}$.

In relation to generator 13, the polarities of the supply voltages and the diodes are reversed and the transistor 33 is of the complementary type. Since the ways in which the generators operate are similar there is no need for further explanation.

The waveform of the second companion signal $U_{b2}$ is also shown in FIG. 2. The coincidence of the video signal and the companion signal now occurs in the declining part of the video signal and the controlled discharge occurs in its rising part.

FIG. 3 shows a modified circuit, in which the difference values $U_{d1}$ and $U_{d2}$ can be set by means of potentiometers 37 and 38 and then remain constant during the scanning of the original irrespective of the brightness of the background of the original 1.

Figure 4:
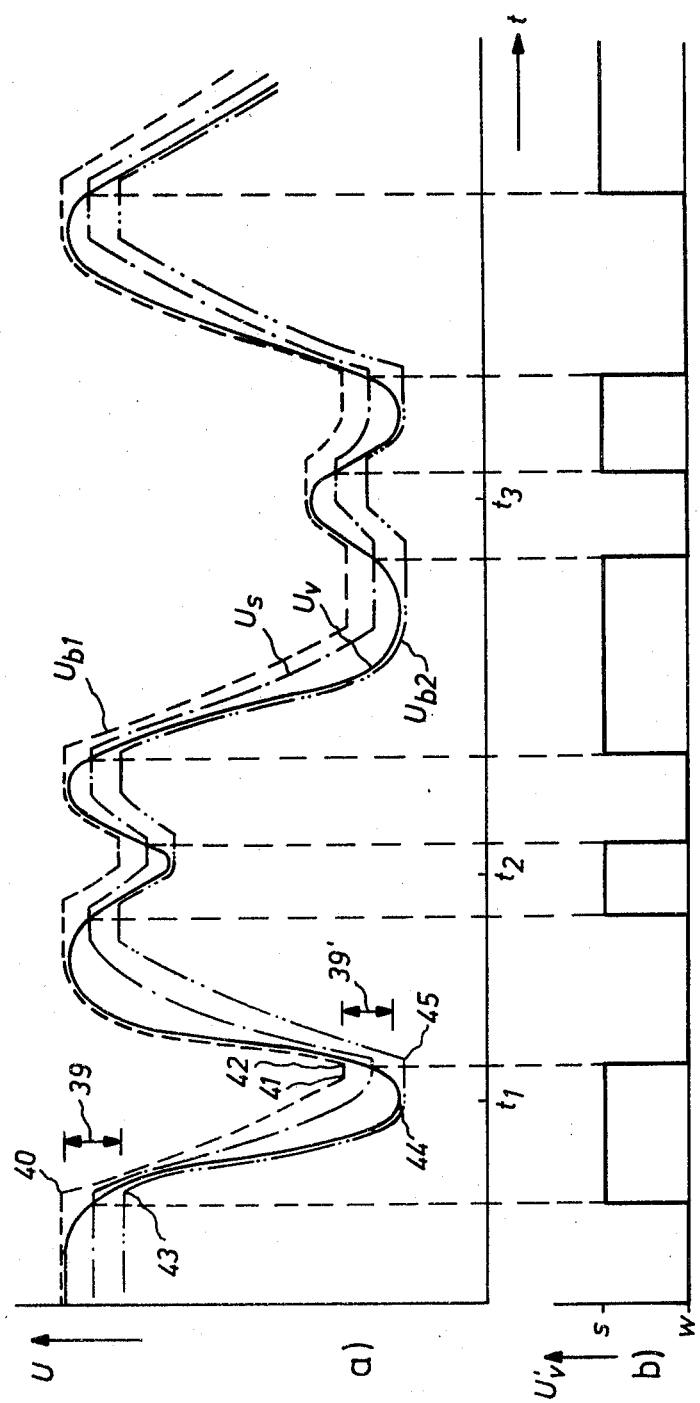
FIG. 4 is a diagram illustrating the evaluation of the video signal.

FIG. 4 is a diagram to illustrate the operation of the generator circuit 12.

Part (a) shows a random waveform for the video signal $U_v$, the waveform of the companion signals $U_{b1}$, $U_{b2}$, which are dependant on the video signal $U_v$, and the waveform of the dynamic threshold signal $U_s$. At (b) is shown the waveform of the digital video signal $U'_v$.

Let it be assumed that the continuous video signal waveform is produced by scanning an original using a single photodiode as the opto-electronic transducer.

When a white part of the original is scanned the resulting amplitude of the video signal $U_v$ is high, with a black part of the original it is low and in cases where grey or coloured regions of the original are scanned it is of a medium level.

As an example let it be assumed that black information on a white background is scanned at time $t_1$, coloured or grey information on a white background at time $t_2$ and grey or coloured information on a black background at time $t_3$.

It will also be assumed that the minimum spacings (difference values $U_{d1}$ and $U_{d2}$) between the accompanying signals $U_{b1}$ and $U_{b2}$ and the reference signal are the same and, as shown in FIG. 3, are independent of the brightness of the background of the original during the scanning of the original. In this case the reference signal is the video signal $U_v$.

It will also be assumed that the dynamic threshold signal $U_s$ occupies an exactly central position between the companion signals $U_{b1}$ and $U_{b2}$.

At the beginning the first companion signal $U_{b1}$ follows the video signal $U_v$ and the second companion signal $U_{b2}$ lies at the minimum spacing 39 from the video signal $U_v$.

At point 40 the first companion signal $U_{b1}$ reaches the minimum spacing 39 from the video signal $U_v$ and it then follows the video signal $U_v$ in an e-function until at point 41 it has closed up to the minimum spacing 39' from the video signal $U_v$. It then remains constant until it coincides with the video signal $U_v$ at point 42 and it then follows the rising video signal $U_v$.

The second companion signal $U_{b2}$ is constant until it meets the video signal at point 43 and it then follows the declining video signal $U_v$ to its minimum value at point 44. At point 45 the minimum spacing 39' from the video signal $U_v$ is reached in turn and companion signal $U_{b2}$ then likewise approaches the video signal $U_v$ following an e-function.

This principle continues to be followed as the video signal $U_v$ progresses onwards. The dynamic threshold signal $U_s$ intersects all the video signal pulses. The points of intersections give the criteria for opting for black or white when generating the digital video signal $U'_v$. In the representation of the digital video signal $U'_v$ at (b) the black value "s" is identified with the logic high and the white value "w" with the logic low. The parts of the video signal $U_v$ lying below the dynamic threshold signal $U_s$ are evaluated as black values for example and those parts of the signal lying above the threshold signal are evaluated as white values.

It can be seen that all the video signal pulses are picked up by the dynamic threshold signal $U_s$ and are taken into account at the time of the conversion into the digital video signal $U'_v$, thus avoiding any loss of information even with low amplitude levels, that is to say low contrasts in the original.

Figure 5:
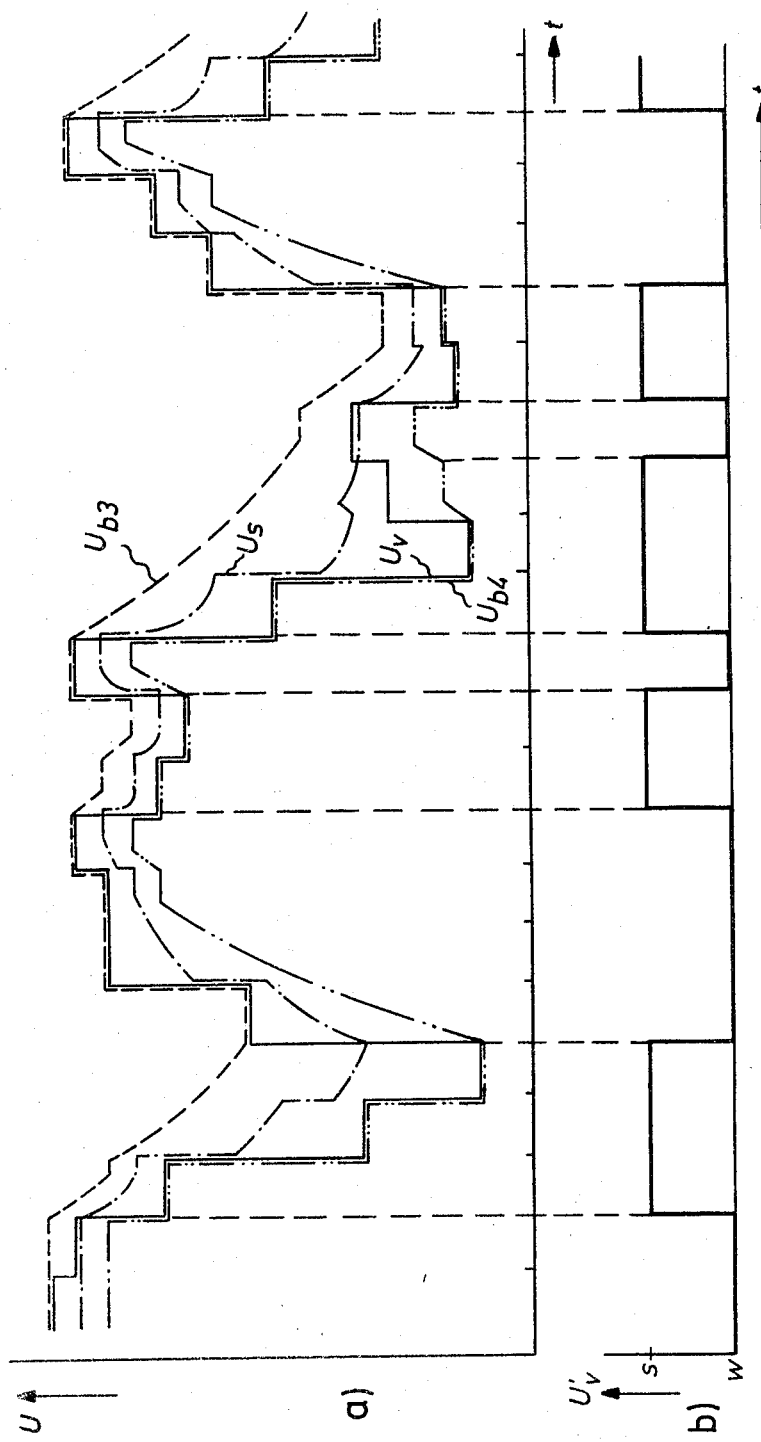
FIG. 5 is a further diagram illustrating the evaluation of the video signal.

FIG. 5 is a diagram similar to FIG. 4. The difference is that the waveform of the video signal $U_v$ is a staircase waveform divided into temporally discrete segments. A signal waveform of this kind results, as already mentioned, when video signal pulses produced by scanning an original with a line of photodiodes are converted into a staircase function by means of a sample-and-hold circuit.

The diagram shows that once again all the information from the original is recognised.

The staircase video signal waveform (a) has the advantage that the digital video signal $U'_v$(b) is available with the correct timing, that is to say the timing edges of the digital video signal $U'_v$ are exactly aligned with the edges of the staircase video signal $U_v$.

FIG. 6 is a diagram showing a modification of the method in which the reference signal used for the minimum spacing of one companion signal is the other companion signal.

In contrast to FIG. 4, in which the companion signals $U_{b1}$ and $U_{b2}$ are able to approach the video signal $U_v$ only to the minimum spacings 39 and 39' respectively, in FIG. 6 the companion signals $U_{b5}$ and $U_{b6}$ close right up to the video signal $U_v$. A minimum spacing 46 is ovserved between the two companion signals $U_{b5}$ and $U_{b6}$.

In (a) the dynamic threshold signal $U_s$ is once again situated between the two companion signals $U_{b5}$ and $U_{b6}$, exactly in the centre for example. The waveform of the digital video signal $U'_v$ at (b) is similar to that in FIG. 4.

An advantages refinement of the invention to avoid the loss of information in particular at the edges of an original will now be explained with reference to the diagram in FIG. 7.

At (a) is shown the waveform of a staircase video signal $U_v$ at the end of an n-$1^{th}$ line and at the beginning of the $n^{th}$ line which follows. Also shown are the companion signals $U_{b1}$, $U_{b2}$ and the dynamic threshold signal $U_s$.

At (b) is shown the waveform of the digital video signal $U'_v$ obtained by comparing the video signal $U_v$ and the threshold signal $U_s$.

It is assumed that in period $t_0-t_1$ white information or a white background, e.g. the white border of the original, is scanned in the n−$1^{th}$ line, the end of the line being reached at time $t_1$. In the period $t_0-t_1$ the video signal $U_v$ is at an amplitude value 49 and the digital video signal $U'_v$ is at the white level "W".

In the period $t_1-t_3$ in which the advance of the scanning member to the next line takes place, the scanning member normally sees "black" and the digital video signal $U'_v$ goes to the black level "S".

Time $t_3$ marks the beginning of the $n^{th}$ line and it is assumed that this line begins with a grey value corresponding to the centre amplitude value 50 of the video signal $U_v$. The grey value in question may derive from information or from a grey background on the original 1. In either case, with conventional techniques, the resulting waveform is 51 for the video signal $U_v$ and 52 for the digital video signal $U'_v$ with the "grey" of the original 1 being reproduced as "white". If however the "grey" is information it will be lost.

In accordance with the concept of the invention, in the period $t_2-t_3$ before each new line is scanned, the video signal $U_v$ is raised to a present amplitude value 53 which is independent of the video signal from the scanning member 5.

The amplitude level 53 may lie between "grey" and "white". Preferably, the amplitude value 53 is dependent on the mean background brightness of the original 1.

Figure 7:
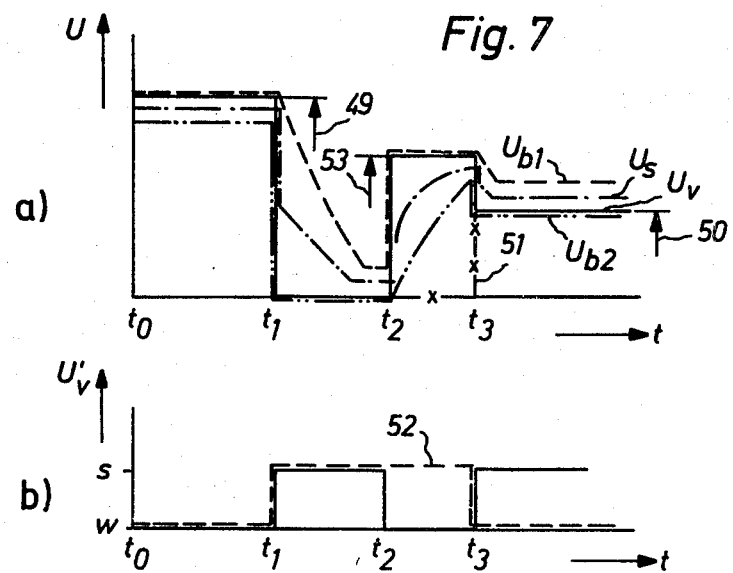
FIG. 7 is a diagram with respect to time.

The waveforms which this measure produces for the various signals are shown in FIG. 7.

The digital video signal $U'_v$ indicates "white" in the interval $t_2-t_3$ and reproduces the grey information at the beginning of the $n^{th}$ line as "black", by which means the loss of grey information particularly at the beginning of lines, such as occurs with conventional methods, is advantageously avoided.

FIG. 8 shows an embodiment of circuit for putting into practice the method illustrated in FIG. 7.

First to be shown is once again the path of the video signal $U_v$ between the scanning member 5 and the modulating stage 11. For the sake of clarity, the generator circuit 12 is merely shown as a functional block. The construction of the generator circuit 12 corresponds to that shown in FIGS. 1 and 2.

Beyond the scanning member 5 and the forming stage 6 is an electronic changeover switch 56 which is represented in FIG. 8 by a mechanical changeover switch. The changeover switch 56 is operated by a control unit 58 via a line 57. At the same time, the control unit 58 also controls the scanning member 5 and the converter stage 6 via lines 59 and 60.

In the period $t_2-t_3$ which is shown in the diagram in FIG. 7, the changeover switch 56 is in the solid-line position. Instead of the video-signal $U_v$, the amplitude level 53 is applied to the comparator stage 8.

Amplitude value 53, represented by a voltage $U_g$, is derived from the video signal $U_v$ on line 29 by means of a generator 61 and is thus proportional to the means brightness of the background of the original. It is also possible for voltage $U_g$ to be set at a constant level by means of potentiometers.

The construction of generator 61 is identical to that of generator 16 in FIG. 1. It is even possible for generator 16 itself to be used if a further potentiometer is fitted at its output.

At the time $t_3$ (FIG. 7) which corresponds to the beginning of a line, changeover switch 56 is changed over to the position shown in broken lines and the video signal $U_v$ produced by the scanning member 5 is converted into the digital video signal $U'_v$.

FIG. 9 shows detailed embodiments of the scanning member, changeover switch, pulse converter stage, and control unit.

SCANNING MEMBER

It will be assumed that as its opto-electronic transducer the scanning member 5 contains an integrated circuit module of the CCD 121 type made by the Fairchild Company. This module comprises a row of photodiodes proper 64 and the interrogating electronics comprising analogue shift registers 65, 66 (charge shifting circuits) and transfer gates 67, 68 connected between the shift registers 65, 66 and the row of photo diodes 64.

In FIG. 8 the row of photodiodes 64 is merely shown as a functional block. It consists of 1728 individual photodiodes which lie in a row and extend across one scan line. Each individual photodiode is connected to a storage capacitor intended to receive a charge proportional to the amount of light received. Under the control of signals $T_1$ and $T_2$, the charges are transferred in parallel to the analogue shift registers 65, 66 via transfer gates 67 and 68. The transfer may for example take place in such a way that the charges from odd-numbered photodiodes are transferred to shift register 65 and the charges from even-numbered photodiodes are transferred to shift register 66.

By means of shift clock-signal $T_3$ and $T_4$, the charges are shifted out of shift register 65 and 66 in series and are converted into the video signal $U_v$ in a charge amplifier 69.

It is also possible for a so-called "self-scanning photodiode row", in which each storage capacitor has an MOS transistor associated with it to act as a switch, to be used as a row of photodiodes with an integrated electronic evaluating circuit. By actuating the switches serially the individual charges are called up and fed out along a video line.

CHANGEOVER SWITCH

The changeover switch 56 is for example an analogue integrated circuit switch 70 which is controlled via a logic control unit 71 by the clock signal $T_2$ on line 57.

SIGNAL FORMING STAGE

The signal forming stage 6 consists for example of known sample-and-hold circuit. With the help of the shift clock-signal $T_3$ on line 60 this circuit converts the input signal into an output signal of staircase form divided into temporally discrete segments.

CONTROL UNIT

The control unit 58 has a clock signal generator 74 which generates a clock signal $T_5$ for counting. The clock signal $T_5$ passes via an AND gate 75 to a flip-flop 76 at whose outputs the opposed-phase shift clock signals $T_3$ and $T_4$ appear.

At the same time the clock signal $T_5$ for counting is counted in a counter 77. Connected to the outputs of the counter 77 is an encoding stage 78 which emits control pulses $T_6$ to $T_9$ at pre-programmed counts. Control pulse $T_6$ may appear at a count of "1777" for example and control pulse $T_9$ at a count of "1785", at which latter count the counter 77 is also reset.

Control pulses $T_6$ and $T_7$ control a flip-flop 79 at whose output the clock signal $T_1$ appears. Control pulses $T_8$ and $T_9$ control a further flip-flop 80 which generates the clock signal $T_2$. By means of a further flip-flop 81, a clock signal $T_{10}$ is produced from clock signals $T_1$ and $T_2$. Clock signal $T_{10}$ controls AND gate 75.

The course of events in the control unit 58 is also illustrated by the diagram of pulses in FIG. 10.

On line (a) is shown the counting clock signal $T_5$ upstream of AND gate 75. After 1728 pulses of clock signal $T_5$, all the 1728 items of scanning information for an $n-1^{th}$ line, corresponding to the 1728 individual diodes in the row of photodiodes 64, have been shifted out from shift registers 65, 66 (end of line).

During this period the row of photodiodes 64 has scanned the $n^{th}$ line and the fresh items of information for this line are transferred to the shift registers 65, 66 via transfer gate 67, 68 at the times of pulses $T_1$ and $T_2$.

During the transfer the counting clock signal $T_5$ is blocked by means of AND gate 75 and control pulse $T_{10}$ (line (d)).

At control pulse $T_9$ (beginning of line), a new counting cycle from 1 to 1728 begins, in which the information on the $n^{th}$ line is shifted out of shift registers 65, 66.

Changeover switch 56 is operated by control pulse $T_2$ (line (c)) on line 57 in such a way that during the pulse contact 70' is closed and contact 70'' open.

To clarify the temporal correlations, the waveform of the output signal from changeover switch 56, which has already been illustrated in FIG. 7, is again shown on line (e).

We claim:

1. In a method usable in a facsimile scanner for converting a video signal obtained by scanning an original point by point and line by line into a two-level signal, wherein first and second companion signals are generated to derive a threshold signal from said companion signals, which follows the video signal dynamically, and wherein said video signal and said threshold signal are compared to obtain said two-level signal, the method comprising the steps of generating said first and second companion signals:

charging first capacitor means, the voltage of which corresponds to said first companion signal, to the actual level of the video signal under the control of first switching means when said video signal rises until the maximum level of the video signal is reached, whereby the first companion signal substantially follows a rise in said video signal;

interrupting the charge of the first capacitor means by said first switching means under the control of the video signal at the maximum level of the video signal, whereby the first companion signal remains at a constant level in the first instance when said video signal declines;

generating a first distance value from said video signal by generator means;

determining continuously actual first difference values between the first companion signal and a first reference signal by first differential means;

discharging the first capacitor means under the control of the first switching means and the first differential means when the actual first difference value is equal to said first distance value, whereby the first companion signal comes close to the decrising video signal;

interrupting the discharge of said first capacitor means under the control of the first switching means and the first differential mean when the actual first difference value is equal to said first distance value again, whereby the first companion signal remains at a constant level in the first instance;

continuing the charge of the first capacitor means under the control of the first switching means when the first companion signal substantially coincides with the rising video signal, whereby the first companion signal follows the rising video signal again;

discharging second capacitor means, the voltage of which corresponds to said second companion signal, to the actual level of the video signal under the control of second switching means when said video signal decrises until the minimum level of the video signal is reached, whereby the second companion signal substantially follows a decrise in said video signal;

interrupting the discharge of said second capacitor means by said second switching means under the control of the video signal at the minimum level of the video signal, whereby the second companion signal remains at a constant level in the first instance when said video signal rises;

generating a second distance value from said video signal by said generator means, whereby said first and second distance values are proportional to the mean brightness values of the background of the original to be scanned;

determining continuously actual second difference values between the second companion signal and a second reference signal by second differential means;

charging the second capacitor means under the control of the second switching means and the second differential means when the actual second difference value is equal to said second distance value, whereby the second companion signal comes close to the rising video signal;

interrupting the charge of said second capacitor means under the control of the second switching means and the second differential means when the actual second difference value is equal to said second distance value again, whereby the second companion signal remains at a constant level in the first instance;

continuing the discharge of the second capacitor means under the control of the second switching means when the second companion signal substantially coincides with the decrising video signal, whereby the second companion signal follows the decrising video signal again.

2. A method according to claim 1, wherein the video signal constitutes the first and second reference signals, and wherein the actual difference values are determined between said video signal and said first and second companion signals.

3. A method according to claim 1, wherein the first and second companion signals constitute the first and second reference signals, and wherein the actual difference values are determined between said first and second companion signals.

4. A method according to claim 1, wherein said first and second distance values are between 5 and 20% of the mean brightness values of the background of the original at any given time.

5. A method according to claim 4, wherein said first and second distance values are 12% of said mean brightness values.

6. A method according to claim 1, wherein the time constants for charging the first capacitor means and for discharging the second capacitor means are made short and the time constants for discharging the first capacitor means and for charging the second capacitor means are made long.

7. A method according to claim 6, wherein the time constants for discharging the first capacitor means and charging the second capacitor means are selected to be approximately equal to the time taken to scan two to five points on the original.

8. A method according to claim 1, wherein, in a region before the beginning of each scanning line the amplitude of the video signal is adjusted to a level which corresponds to a tone-value-range between "grey" and "white".

9. A method according to claim 8, wherein the level is derived from the brightness values of the background of the original to be scanned.

* * * * *